March 4, 1958　　　E. A. SCHROEDER ET AL　　　2,825,416
POWER OPERATED AGRICULTURAL IMPLEMENT WITH
MOTOR DRIVING THE STEERING WHEEL
Filed March 13, 1956　　　　　　　　　　　2 Sheets-Sheet 1
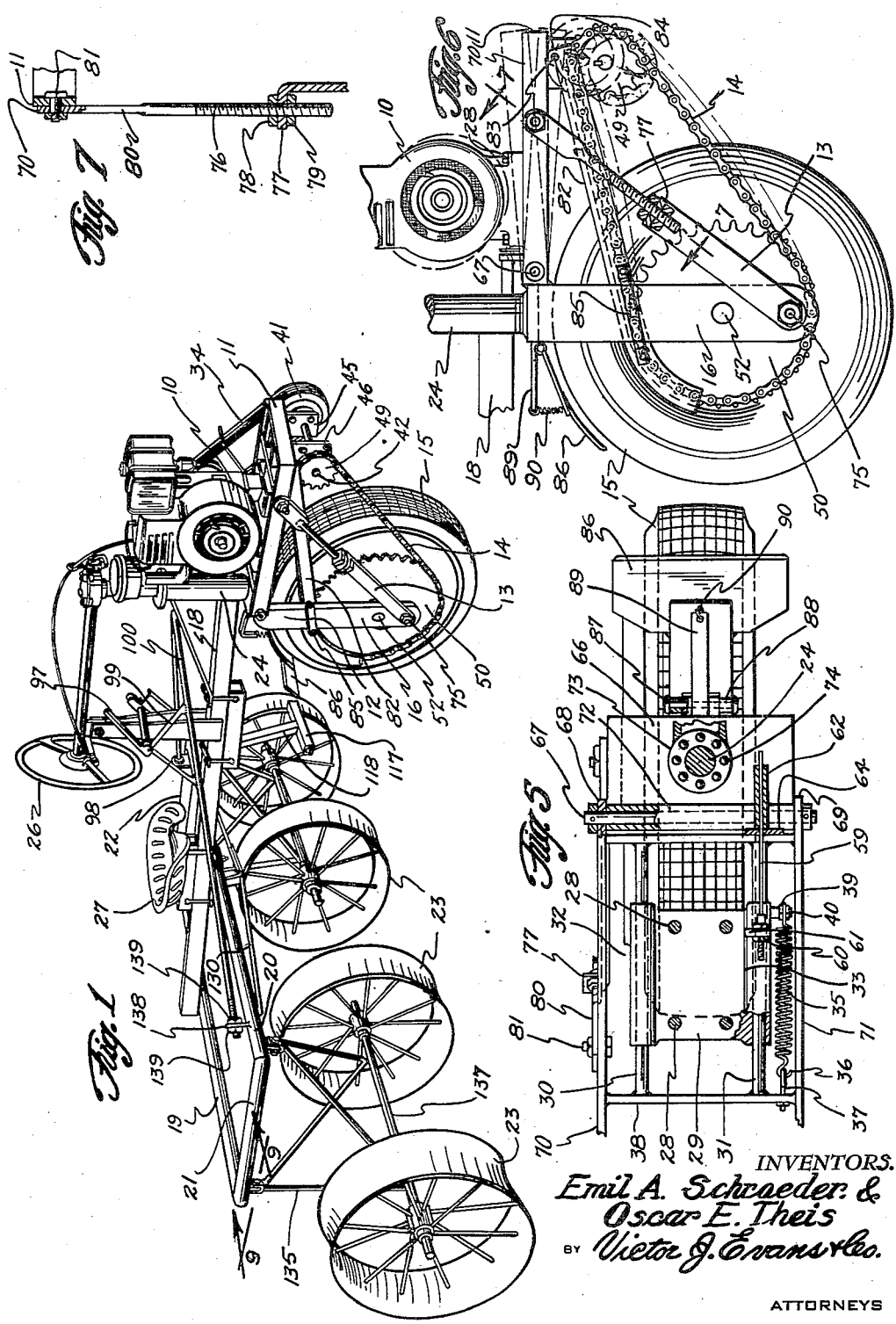
INVENTORS.
*Emil A. Schroeder &
Oscar E. Theis*
BY *Victor J. Evans & Co.*
ATTORNEYS

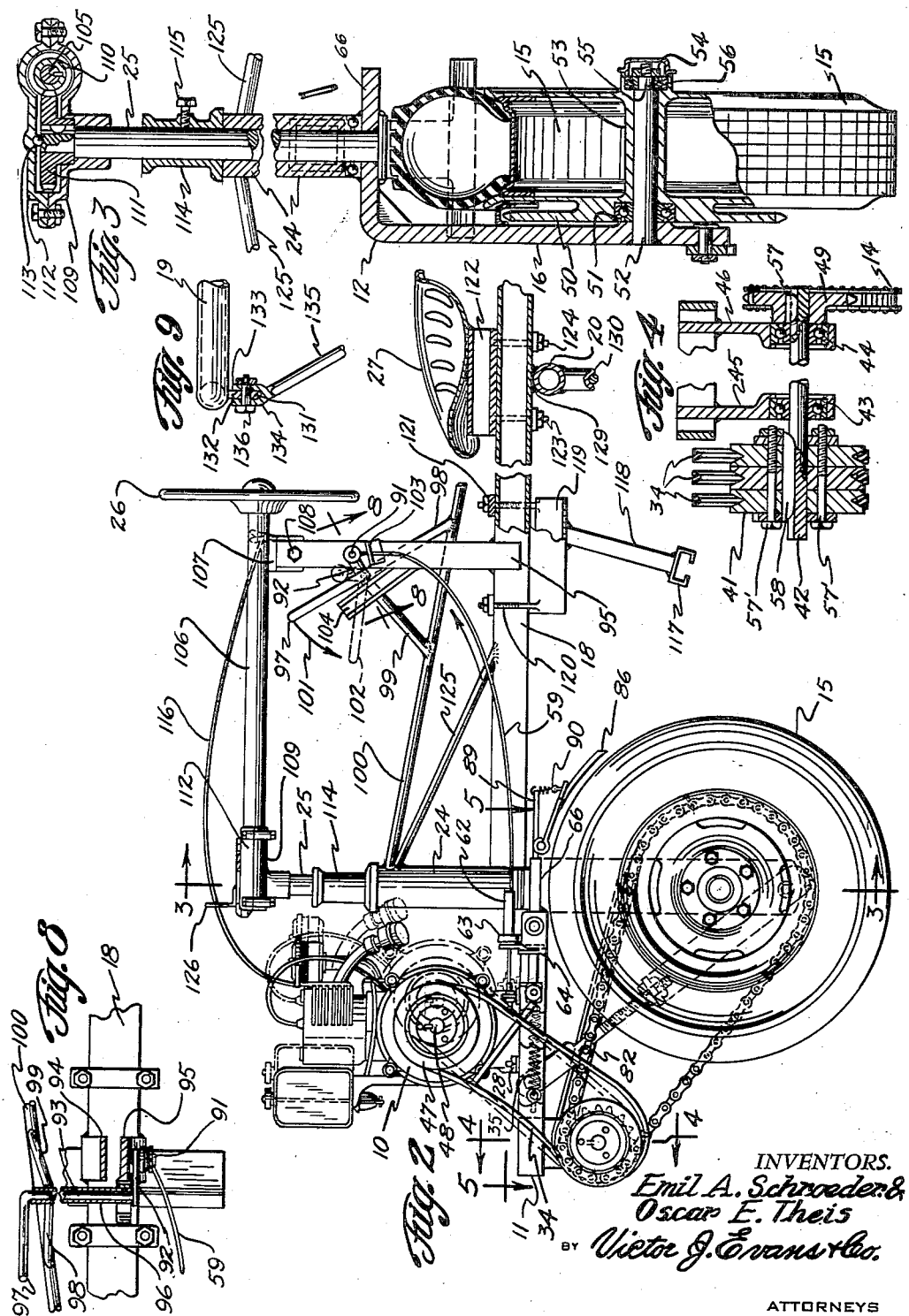

United States Patent Office 2,825,416
Patented Mar. 4, 1958

2,825,416

POWER OPERATED AGRICULTURAL IMPLEMENT WITH MOTOR DRIVING THE STEERING WHEEL

Emil A. Schroeder and Oscar E. Theis, Thorndale, Tex.

Application March 13, 1956, Serial No. 571,299

1 Claim. (Cl. 180—26)

This invention relates to power driven agricultural implements of the type particularly adapted for rolling or pressing the seed bed of cotton and corn and which is also adapted for spraying row crops, and in particular a horizontally positioned transversely disposed frame adapted to be mounted on pressing rollers or wheels or upon wheels with pneumatic tires thereon and a power unit connected to the frame with a longitudinally disposed beam and having an engine adjustably mounted on an adjustable platform supported by a single wheel.

The purpose of this invention is to provide a self propelled implement adapted to be actuated by a single operator which is adapted to carry wheels for rolling or pressing a seed bed or vehicle wheels so that the device may be used for spraying.

The present invention contemplates a power implement having an engine mounted on a platform on a single wheel with the wheel carried by a bracket pivotally mounted at the forward end of a beam extended from a frame upon which pressing rollers or wheels having pneumatic tires thereon may be mounted and wherein the single wheel upon which the engine is mounted is turned for steering by a steering wheel positioned ahead of a seat on the frame and connected through a gear box to a vertically disposed shaft on the lower end of which the bracket is mounted.

The object of this invention is, therefore, to provide means for mounting a relatively simple power unit on a farm implement frame whereby the frame is adapted to carry pressing wheels for packing soil in rows of seed or vehicle wheels so that the device may also be used for spraying.

Another object of the invention is to provide a power implement for farm use in which the device is adapted to be operated by a single attendant.

A further object of the invention is to provide a self propelled agricultural implement in which parts thereof are interchangeable so that the implement may be used for different purposes.

A still further object of the invention is to provide a power implement for agricultural use in which the device is of a simple and economical construction.

With these and other objects and advantages in view the invention embodies a horizontally disposed transversely positioned rectangular-shaped frame having means for attaching, selectively, pressing wheels for packing soil over seed, or vehicle wheels thereon and a power unit extended forwardly of the frame and connected thereto with a longitudinally disposed beam in which the power unit is adapted to be used for steering and in which transmission elements of the power unit are adapted to be adjusted to provide take-up means therein.

Other features and advantages of the invention will appear from the following description taken in connection with the drawings, wherein:

Figure 1 is a perspective view illustrating the complete power implement showing the frame provided with rolling or pressing wheels such as are adapted for packing the seed bed of cotton and corn.

Figure 2 is a side elevational view of the power unit with parts of the beam connecting the power unit to an implement carrying frame broken away and shown in section, said parts being shown on an enlarged scale.

Figure 3 is a vertical section taken on line 3—3 of Fig. 2 with the parts shown on a further enlarged scale and with parts broken away, showing in particular, the supporting wheel of the power unit and the bracket and stem for pivotally mounting the power unit to facilitate steering.

Figure 4 is a cross section taken on line 4—4 of Fig. 2 illustrating the transmission elements including a countershaft, pulleys and sprockets.

Figure 5 is a sectional plan taken on line 5—5 of Fig. 2 showing the adjustable platform of the power unit and also with parts broken away.

Figure 6 is a side elevational view of the lower portion of the power unit showing the chain drive from the countershaft to the single traction wheel and an adjustable brace for raising and lowering the platform upon which the engine is mounted to take up slack in the chain.

Figure 7 is a section taken on line 7—7 of Fig. 6 also showing the adjustable bracket.

Figure 8 is a section taken on line 8—8 of Fig. 2 showing a hand lever for actuating a flexible cable to draw the engine against a spring to take up slack in belts between the engine and countershaft.

Figure 9 is a section taken on line 9—9 of Fig 1 illustrating one of the separable connections for mounting the rolling or pressing wheels or the vehicle wheels on the frame.

Referring now to the drawings wherein like references characters denote corresponding parts the self propelled agricultural implement of this invention includes a motor or engine 10 mounted on a platform 11, an L-shaped bracket 12 on which the platform is adjustably mounted, a brace 13 for adjusting the position of the motor platform to maintain tension in a chain 14, a traction wheel 15 rotatably mounted on a vertically disposed leg 16 of the bracket 12, a beam 18 extended from a frame having side rails 19 and 20 and end rails 21 and 22, pressing rollers 23 carried by the frame, a vertically disposed cylindrical head 24 carried by the forward end of the beam, a shaft 25 rotatably mounted in the head 24, and a steering wheel 26 mounted to be actuated by an operator on a seat 27 positioned on the beam 18.

The motor 10 is mounted by bolts 28 on a base plate 29 which is slidably mounted on parallel rods 30 and 31 that extend through hubs 32 and 33 at the sides of the base plate. The motor is urged forwardly to an inoperative position, wherein slack is provided in V-belts 34 with a spring 35, one end 36 of which is attached to an eye bolt 37 on a cross bar 38 of the platform 11, and the opposite end 39 of which is secured to a stud 40 extended from the base plate 29. The belts 34 are trained over pulleys 41 on a countershaft 42 rotatably mounted in bearings 43 and 44 of hangers 45 and 46, respectively, which depend from the platform 11 and also over similar pulleys 47 on the motor shaft 48.

The end of the shaft 42, opposite to that on which the pulleys 41 are mounted is provided with a sprocket 49 over which the chain 14 is trained, the chain also being trained over a sprocket 50 which is rotatably mounted by a bearing 51 on a stud 52 mounted in the vertical leg 16 of the bracket 12 and, as illustrated in Fig. 3, the sprocket 50 is provided with a hub 53 which forms part of the wheel 15, the wheel being secured on the stud or spindle with a lock nut 54 and the outer end being rotatably mounted on a pin 55 at the end of the stud with a bearing 56.

The sprocket 49 is secured on the countershaft 42 with a key 57 and the pulleys 41, which are clamped together with bolts 57' are secured on the countershaft with a key 58.

In use, the motor is drawn and held against the spring 35 with a flexible shaft or cable 59 that is secured by lock nuts 60 in a stud 61, the shaft extending through a sheaf 62 mounted by a collar 63 in a bracket 64 extended upwardly from the platform.

The platform 11 is pivotally mounted on a plate 66, forming the horizontal arm of the bracket 12, with a pin 67 which extends through bearings 68 and 69 on side rails 70 and 71 of the platform 11 and also through a hub 72 at one side of the plate 66.

The lower end of the cylindrical head 24 is provided with a flange 73 by which the head is secured to the plate 66 with bolts or rivets 74.

The brace 13 is pivotally connected, at the lower end, with a bolt 75 to the lower end of the vertical leg 16 of the bracket 12 and the upper end is connected by a threaded rod 76, which extends through a flange 77 on the upper end of the brace and which is secured in the flange with lock nuts 78 and 79, and the upper end of the rod, which is provided with a flat section 80 is secured by a stud bolt 81 to the side bar 70 of the platform 11. By this means the elevation of the platform 11 is adapted to be adjusted to take up slack in the chain 14. The upper section of the chain is covered with a shield 82, the upper end of which is pivotally connected with a bolt 83 to an ear 84 depending from the frame 11 and the opposite end of which is secured by a strap 85, to the leg 16 of the bracket. The device is also provided with a guard 86 that is pivotally mounted on the edge of the plate 66 with pins 87 and 88 and the guard is suspended by an arm 89 to which the shield is connected with a spring 90.

The flexible shaft 59 by which the motor 10 is drawn rearwardly against the spring 35 to hold the belts 34 in tension is connected by a pin 91 to an arm 92 extended from the end of a rod 93 which is pivotally mounted on a post formed with bars 94 and 95 with a bearing 96 and the opposite end of which is provided with a lever 97 that is supported by braces 98 and 99 from a rod 100, as shown in Fig. 8 and, as indicated by the arrow 101 the lever 97 is moved downwardly, such as to the position indicated with the dotted lines 102 whereby the flexible shaft 59 is drawn rearwardly sliding the motor to the rear and placing tension in the belts 34. The bar 95 is provided with a clip angle 103 in which an opening is provided for the flexible cable 59 whereby a guide is provided for the end of the shaft or cable. The post formed by the bars 94 and 95 is also provided with a brace 104.

The steering wheel 26 is carried on the end of a rod 105 that is rotatably mounted in a sleeve 106 which is mounted by a tang 107 in the upper ends of the bars 94 and 95 with a bolt 108 and the opposite end of the rod extends into a gear housing 109 in which a worm 110 on the rod 105 meshes with a worm gear 111 on the vertically disposed shaft 25 by means of which the bracket 12 and wheel 15 are turned for steering. The upper section 112, of the gear housing is provided with a thrust bearing 113 and the shaft is provided with a set collar 114 having a set screw 115 therein, the set collar being positioned to rest upon the upper end of the head 24 on the end of the beam 18.

The upper end of the post formed by the bars 94 and 95 is also provided with a throttle 116 by which the engine or motor 10 is controlled.

The beam 18 is provided with a foot rest 117 which is suspended by an arm 118 from a channel-shaped support 119 which is secured to the under surface of the beam 18 with bolts 120 and 121. The seat 27 is mounted on the upper surface of the beam 18 in a similar manner, wherein a channel-shaped support 122 upon which the seat is secured, such as by welding, is secured to the beam 18 with bolts 123 and 124. The head 24 is retained in an upright position by diagonal braces 125 which extend from the beam 18 and the forward end of the upper section 112 of the gear box 109 is provided with a guide 126 through which the control wire or rod 116 extends.

The rails 19 and 20 of the horizontally disposed transversely positioned implement carrying frame are secured to the beam 18, such as by welding, as indicated by the numeral 129 and the forward rail 20 is reinforced with a truss member 130.

The rails 19 and 20 of the implement carrying frame are provided with tabs 131 to which sections 132 and 133 of bifurcated ends 134 of braces 135 are secured with bolts 136.

The braces 135 which are secured to the tabs of the frame with bolts 136 are secured, such as by welding, to axles 137 on which the seed covering or pressing wheels 23 are mounted and it will be understood that as many of the pressing wheels as desired may be used, and it will also be understood that these wheels may be replaced with vehicle wheels, such as the wheel 15 for transportation.

The forward rail 20 is also provided with tabs 138 to which ends of the brace rod 100 are secured with nuts 139.

With the parts designed and assembled as illustrated and described an operator positioned on the seat 27 of the implement may drive the device over seed rows, such as following a planter, pressing the soil over the seed, particularly of corn and cotton and when the device is designed for other purposes, such as for use in spraying, the wheels 23 may be replaced with vehicle wheels, such as wheels with pneumatic tires and the machine may be provided with an auxiliary motor for operating spraying devices for spraying row crops, and the like.

It will be understood that other modifications, within the scope of the appended claim, may be made in the design and arrangement of the parts without departing from the spirit of the invention.

What is claimed is:

In an agricultural implement, a platform, a base plate slidably mounted on said platform, an engine mounted on said base plate, a spring member for urging said engine and base plate to a forward position, a cable for selectively maintaining said engine and base plate in a rearward operative position, a lever for actuating said cable, a bracket providing an adjustable pivotal support for said platform, a traction wheel connected to said bracket, means connecting said engine to said traction wheel, a frame arranged rearwardly of said platform and said frame including side rails and end rails, said frame being horizontally disposed, pressing rollers carried by said frame, a beam extending forwardly from said frame and secured thereto, said beam being horizontally disposed, a head carried by the forward end of said beam and said head being arranged above said bracket, a shaft secured to said bracket and rotatably mounted in said head, a seat on said beam, a steering wheel arranged contiguous to said seat, means secured to said steering wheel and shaft for causing turning movement of said traction wheel upon rotation of said steering wheel, means associated with said platform and bracket for adjusting the elevation of said platform, a foot rest mounted below said beam, said pressing rollers being detachably mounted below said frame, said rollers being arranged in pairs and being positioned so as to prevent seed beds from being packed.

References Cited in the file of this patent

UNITED STATES PATENTS

| | | |
|---|---|---|
| 1,347,818 | Malin | July 27, 1920 |
| 2,375,046 | Steele | May 1, 1945 |
| 2,508,605 | Hagie et al. | May 23, 1950 |
| 2,606,623 | Vickers | Aug. 12, 1952 |
| 2,701,022 | Chestnutt | Feb. 1, 1955 |
| 2,749,137 | Thomsen et al. | June 5, 1956 |